A. WOLLENSAK AND F. A. G. PIRWITZ.
PHOTOGRAPHIC SHUTTER.
APPLICATION FILED FEB. 24, 1921.
1,435,999.
Patented Nov. 21, 1922.
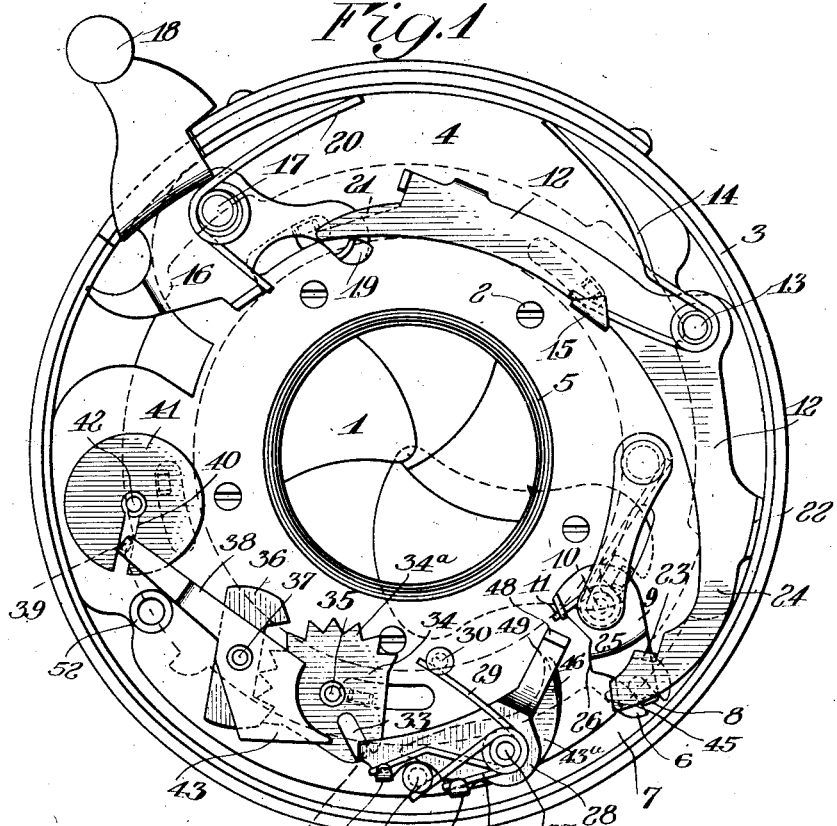
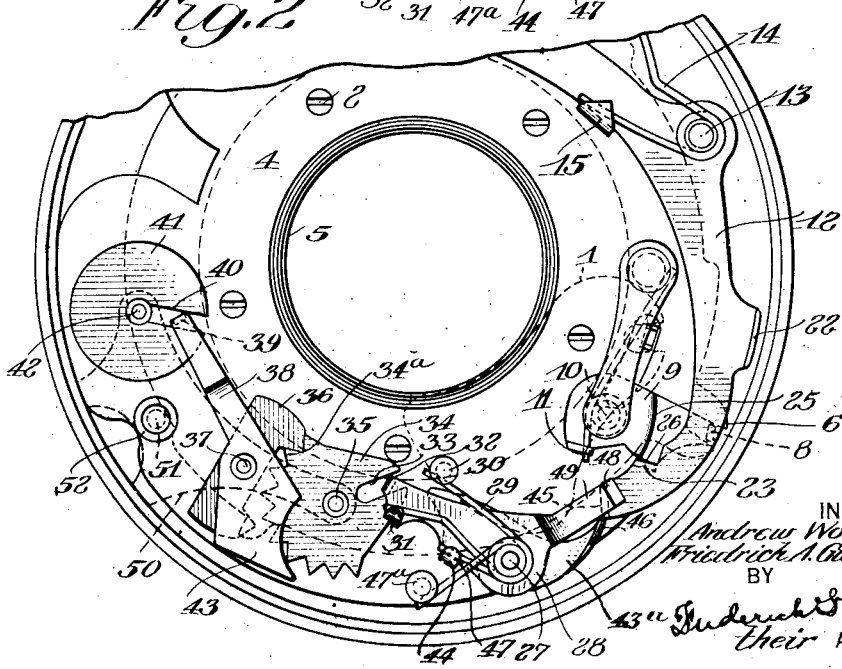
INVENTORS
Andrew Wollensak
Friedrich A. Gustav Pirwitz
BY
their ATTORNEY Patented Nov. 21, 1922.

1,435,999

UNITED STATES PATENT OFFICE.

ANDREW WOLLENSAK AND FRIEDRICH A. GUSTAV PIRWITZ, OF ROCHESTER, NEW YORK, ASSIGNORS TO WOLLENSAK OPTICAL COMPANY, OF ROCHESTER, NEW YORK, A CORPORATION OF NEW YORK.

PHOTOGRAPHIC SHUTTER.

Application filed February 24, 1921. Serial No. 447,470.

*To all whom it may concern:*

Be it known that we, ANDREW WOLLENSAK and FRIEDRICH A. GUSTAV PIRWITZ, of Rochester, in the county of Monroe and State of New York, have invented certain new and useful Improvements in Photographic Shutters; and we do hereby declare the following to be a full, clear, and exact description of the same, reference being had to the accompanying drawings, forming a part of this specification, and to the reference numerals marked thereon.

Our present invention relates to photography and more particularly to photographic shutters of the blade type in which the duration of exposure is timed by a retarding mechanism that exerts a variable resistance upon the element that actuates the blades to closed position and the invention has for its object to provide a simple, cheap and dependable retarding device for this purpose. The improvements are directed in part toward simplifying the moving parts both in their formation and their ease of assembly while producing a shutter that is uniform and efficient in its action. To these and other ends the invention resides in certain improvements and combinations of parts all as will be hereinafter described more fully, the novel features being pointed out in the claims at the end of the specification.

In the drawings:

Figure 1 is a front view of a shutter constructed in accordance with and illustrating one embodiment of our invention with the cover plate removed;

Figure 2 is a view similar to Figure 1 but with the shutter blades open.

Similar reference numerals throughout the several views indicate the same parts.

We have illustrated our invention in the present instance embodied in an automatic type shutter of the familiar pivoted blade symmetrical opening or diaphragm type, the blades being indicated at 1, their pivots at 2. This blade mechanism may be of known construction and an understanding of its details is not essential to a full description of the present invention. It will suffice to say, therefore, that the blades are confined between the back or bottom of an annular shutter casing 3 and a partition plate 4 on which latter the shutter operating mechanism and the retarding mechanism hereinafter described are mounted. The central exposure opening 5 of the annular case, of course, extends through the partition member 4 and the blades are operated by a forked member 6 extending into cutaway portions 7 of the partition 4. This forked member is engaged by the downwardly turned end 8 of an actuator 9 pivoted on a stud 10 and returned to the normal position of Figure 1 by a spring 11 encircling the stud to hold the blades closed. When the fork 6, which has a segmental movement, is swung in a counter-clockwise direction to the position of Figure 2 in the manner hereinafter described, the blades are opened.

The shutter is driven by a master lever 12 pivoted at 13 under the motive power of a spring 14 coiled about the pivot and acting against the case and against an ear or lug 15 on the lever. The lever is set and the spring placed under tension when rocked in a clockwise direction on its pivot by an operating lever 16 pivoted at 17 and having a finger portion 18 on the exterior of the casing. When this operating lever is pressed in a counter-clockwise direction, a finger 19 thereon engages the master lever 12 and sets it, though immediately releasing it by slipping off the end thereof in the usual manner of an automatic shutter. The operating lever 16 is thereafter returned to its normal position by a spring 20 and in doing so, the finger 19 rides beneath a bevelled portion 21 of the master lever and displaces it laterally to regain its original co-operative relationship, the master lever being sufficiently resilient for this purpose.

The normal or deenergized position of the master lever, as shown in Figure 1, is determined by the engagement of an abutment 22 thereon with a wall of the case and when it is set by the operating lever, a downwardly turned ear 23 on the arm 24 thereof rides up an incline 25 on the blade actuator 9 and engages with a shoulder 26 on the latter with which it snaps into contact, these lateral movements being permitted by the resiliency of the master lever. When the latter is immediately released, as before explained, the spring driven master member carries the blade actuator 9 with it and opens the blades, as shown in Figure 2, The shoulder 26 is curved so that after the blades have reached their open position, the ear 23 slips off of it, permitting the actuator 9 to return and close the blades by means of its own spring 11.

While the master member is holding the blades open in this manner, it is simultaneously acting upon the retarding device which is preferably constructed as follows:

Pivoted on a stud 27 is a swinging or rocking lever 28 normally held in the position of Figure 1 by a spring 29 coiled about the pivot and acting against a fixed pin 30 on the plate 4 and an ear 31 on the lever itself. One arm of this lever is formed at its extremity with a downwardly extending projection 32 engaging the walls of a slot 33 formed in an escapement member 34 turning on a stud 35 through an angle of about 60 degrees, the segmental toothed portion 34$^a$ of said escapement being on the opposite side of the pivot 35 from the slotted portion 33. An anchor 36 cooperates with the escapement member in the usual manner, being mounted on a stud 37 and fixed to this anchor is a vibratory arm or lever 38 having a downwardly turned projection 39 at its outer end engaging with the walls of a radial slot 40 of a vibratory balance wheel or weight 41 turning on a stud 42. The opposite end of the lever 38 is counter-weighted as shown at 43 and it will be seen from the foregoing that the swinging movement of the escapement 34 and the consequent oscillation of the anchor 36 will set up a vibratory movement of the arm 38 which, in turn, slides in the slot 40 and rapidly reverses the movement of the balance wheel or weighted element 41 in opposite directions, the inertia of the latter, the arm, the anchor and the escapement being cumulatively loaded upon the swinging movements of the lever 28 and transmitted one through the other.

The lever 28 is swung in a clockwise direction from the position of the figures to so transmit motion to the retarding device while the ear 23 of the master member is dwelling on the shoulder 26 of the blade actuator to hold the blades open. For this purpose, there is pivoted upon the stud 27 of the lever 28, to turn therewith but also independently thereof, a lever 43$^a$ having a lug 44 adapted to engage the lever 28 and lock the two for joint movement in the operative or clockwise direction of the latter only. When the master member is moved by the operating member to ride the cam 25 on the blade actuator 9 and engage the ear 23 of the master member with the actuator, another ear 45 on the master member is thereby first lifted over and then engaged with an arm 46 of the lever 43$^a$ so that as the master member is released by the operating member immediately at the conclusion of its setting movement, it rocks the lever 43 as well as the blade actuator 9 and communicates its movement to the retarding device by swinging the lever 28. When the ear 23 of the master member slips off of the blade actuator 9, allowing the blades to close, it also slips off of the end of the arm 46 of the operating lever 43$^a$ allowing the latter to return to its former initial position under the influence of a spring 47 engaging the lug 44 and a fixed pin 47$^a$ at its respective ends. The lever 28 itself will also return but more slowly and the lever 43 returns independently in order that the master lever may quickly pick it up again, if necessary, always at the same place.

To regulate the resistance of the retarding device or the extent of the load that it imposes upon the master member, the throw of the lever 28 is varied, that is, the lever is adjusted to be picked up at an early or late point by the lever 43$^a$. For this purpose, the usual rotary cam or other preferred adjusting device on the casing cover (not shown) is employed to act upon the pin 48 on an arm 49 of the lever that takes the contact of spring 29 to advance the lever against the tension of this spring in a clockwise direction. By this means, it may be advanced so far that it is not reached at all by the lever 43$^a$ during the actuation of the latter by the master member.

A shutter constructed in accordance with our invention is very easily and quickly assembled, particularly with respect to the retarding mechanism and we prefer to mount the elements 36—38, 34 and 41 so that they may be readily lifted off of their stud and dispensed with either individually or collectively, to vary the maximum resistance of the retarding mechanism, even when given its full throw. In other words, the retarding device is operative but with lesser retarding effect with the balance wheel 41 omitted or with the balance wheel 41 and the arm 38 with its anchor, in which latter case the mere inertia of the escapement member 34 is the only resistance. To hold these parts on their studs in an easily demountable manner, we provide a suitably shaped plate 50 shown in dotted lines in Figure 2 which plate lies close against the ends of the studs 35, 37 and 42. It has a downwardly projecting pin 51 that fits within an upstanding tube or socket member 52 and is prevented from turning therein by the engagement shown with the circumferential wall of the annular case. The plate 50 is itself held in its socket by suitable contact with the shutter casing cover.

We claim as our invention:

1. In a photographic shutter, the combination with blade mechanism, a master member for actuating the same and means for operating the master member, of a retarding device embodying an escapement, a swinging member geared to said escapement, means for regulating the initial position of the swinging member and a device pivoted axially of the swinging member but movable independently thereof and adapted to be driven by the master member and to drive the swinging member.

2. In a photographic shutter, the combination with blade mechanism, a master member for actuating the same and means for operating the master member, of a retarding device embodying an escapement, a swinging member geared to said escapement, means for regulating the initial position of the swinging member and a device pivoted axially of the swinging member but movable independently thereof and adapted to be driven by the master member and to drive the swinging member, a spring for moving the pivoted device always to the same initial position and means for throwing the master member into engagement therewith at the latter position.

3. In a photographic shutter, the combination with blade mechanism, a master member for actuating the same and means for operating the master member, of a retarding device embodying a vibratory escapement having a slot therein, a swinging member having sliding engagement in the slot and actuated by the master member and an anchor cooperating with the escapement.

4. In a photographic shutter, the combination with blade mechanism, a master member for actuating the same and means for operating the master member, of a retarding divice embolying a vibratory escapement having a slot therein, a swinging member having sliding engagement in the slot and actuated by the master member, an anchor cooperating with the escapement, a balance wheel and means for driving the latter from the anchor.

5. In a photographic shutter, the combination with blade mechanism, a master member for actuating the same and means for operating the master member, of a retarding device embodying a vibratory escapement having a slot therein, a swinging member having sliding engagement in the slot and actuated by the master member, an anchor cooperating with the escapement, a balance wheel having a slot therein, and means vibrating with the anchor and slidably engaging the walls of the slot in the balance wheel.

ANDREW WOLLENSAK.
FRIEDRICH A. GUSTAV PIRWITZ.